US012607867B2

(12) United States Patent
Chen et al.

(10) Patent No.: US 12,607,867 B2
(45) Date of Patent: Apr. 21, 2026

(54) FISHEYE LENS DOT PROJECTOR

(71) Applicant: Lumentum Operations LLC, San Jose, CA (US)

(72) Inventors: James Chen, New Taipei City (TW); Michael Miller, Ottawa (CA); Lijun Zhu, Dublin, CA (US); Vincent V. Wong, Los Altos, CA (US); Russell Latham, Ottawa (CA); Benjamin Kesler, Sunnyvale, CA (US)

(73) Assignee: Lumentum Operations LLC, San Jose, CA (US)

( * ) Notice: Subject to any disclaimer, the term of this patent is extended or adjusted under 35 U.S.C. 154(b) by 418 days.

(21) Appl. No.: 18/185,845

(22) Filed: Mar. 17, 2023

(65) Prior Publication Data

US 2024/0241388 A1 Jul. 18, 2024

Related U.S. Application Data

(60) Provisional application No. 63/479,926, filed on Jan. 13, 2023.

(51) Int. Cl.
| | |
|---|---|
| *G02B 27/09* | (2006.01) |
| *G01B 11/25* | (2006.01) |
| *G02B 27/00* | (2006.01) |
| *G02B 27/30* | (2006.01) |
| *G02B 27/42* | (2006.01) |

(52) U.S. Cl.
CPC ........ *G02B 27/0955* (2013.01); *G01B 11/254* (2013.01); *G02B 27/0025* (2013.01); *G02B 27/0916* (2013.01); *G02B 27/30* (2013.01); *G02B 27/4233* (2013.01)

(58) Field of Classification Search
CPC ............ G02B 27/0955; G02B 27/0025; G02B 27/0916; G02B 27/30; G02B 27/4233; G01B 11/254
USPC ........................................ 359/558
See application file for complete search history.

(56) References Cited

U.S. PATENT DOCUMENTS

| | | | | |
|---|---|---|---|---|
| 2016/0127713 A1* | 5/2016 | Hazeghi | ................. | G02B 27/48 |
| | | | | 359/558 |
| 2020/0284883 A1* | 9/2020 | Ferreira | ................ | G01S 7/4815 |
| 2021/0399530 A1* | 12/2021 | Shirazi Hosseini Dokht | .............. | |
| | | | | G03B 21/2033 |

* cited by examiner

*Primary Examiner* — Bumsuk Won
*Assistant Examiner* — Mitchell T Oestreich
(74) *Attorney, Agent, or Firm* — Harrity & Harrity, LLP

(57) ABSTRACT

In some implementations, a dot projector optic may include a collimating lens; a fisheye lens; and a dot aberration correction element disposed between the collimating lens and the fisheye lens. An input to the fisheye lens, from the dot aberration correction element, may be associated with a first field of view angle. An output from the fisheye lens may be associated with a second field of view angle that is larger than the first field of view angle.

20 Claims, 7 Drawing Sheets

250

Spherical Screen

Missing corners 130 degs 110 degs

200

Flat Screen

Distorted corners 130 degs 110 degs

Optical Layout Zoom-in of Group 1

500

Tiling DOE "On" and suppressed orders with a single VCSEL emitter active area

| (-2,1) | (-1,1) | (0,1) | (1,1) | (2,1) |
|--------|--------|-------|-------|-------|
| (-2,0) | (-1,0) | (0,0) | (1,-1) | (2,0) |
| (-2,-1) | (-1,-1) | (0,-1) | (1,-1) | (2,-1) |

Off    On

= Layout

500
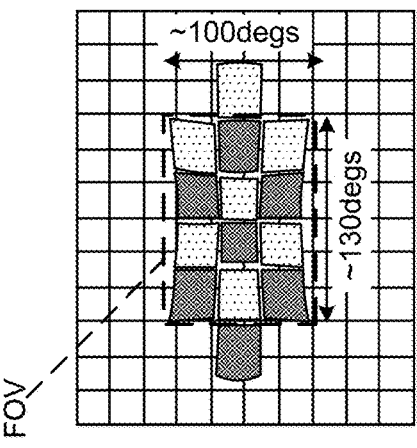
~100degs
~130degs
FOV
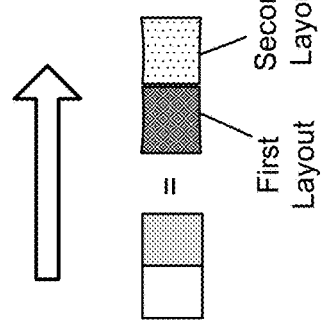
Second Layout
First Layout
=
FIG. 5B
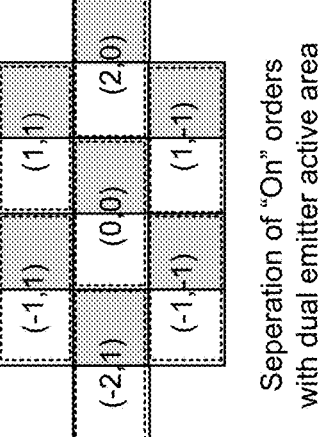
(2,0)
(1,1)        (1,-1)
(0,0)
(-1,1)        (-1,-1)
(-2,1)
Seperation of "On" orders
with dual emitter active area

FISHEYE LENS DOT PROJECTOR

CROSS-REFERENCE TO RELATED APPLICATION

This patent application claims priority to U.S. Provisional Patent Application No. 63/479,926, filed on Jan. 13, 2023, and entitled "DOT PATTERN PROJECTOR WITH LOW FLAT SCREEN DISTORTION." The disclosure of the prior application is considered part of and is incorporated by reference into this patent application.

TECHNICAL FIELD

The present disclosure relates generally to a dot projector and to fisheye lens optics for a dot projector.

BACKGROUND

A dot projector (also referred to as a "pattern projector") can be used in a variety of three-dimensional (3D) sensing applications, such as a facial recognition application or a gesture recognition application. Typically, a dot projector includes an array of emitters, one or more lenses, and one or more beam splitting gratings. The one or more lenses operate in conjunction with the one or more beam splitting gratings to project and create a number of duplications of a dot pattern from light emitted by emitters in the array.

One example of a dot projector is a structured light system, which may include an emitter array (e.g., a vertical-cavity surface-emitting laser (VCSEL) array), a lens, and a diffractive optical element (DOE). In operation, light emitted by emitters of the emitter array is collimated by the lens, and beams of collimated light (each corresponding to a respective emitter) are directed to the DOE. The DOE distributes the collimated beams of light in order to create a dot projection (e.g., a projection of the collimated beams). More specifically, the DOE diffracts a given beam of light such that diffracted orders of the given beam are transmitted by the DOE at different angles. An angular extent of the diffraction occurs over a range of angles relative to a surface of the DOE, referred to as a field of view (FOV). These differently directed diffracted orders form a dot projection (e.g., that includes thousands or tens of thousands of spots) in the FOV.

SUMMARY

In some implementations, a dot projector optic includes a collimating lens; a fisheye lens; and a dot aberration correction element disposed between the collimating lens and the fisheye lens, wherein an input to the fisheye lens, from the dot aberration correction element, is associated with a first field of view angle, and wherein an output from the fisheye lens is associated with a second field of view angle that is larger than the first field of view angle.

In some implementations, an optical system includes a plurality of emitters; and a plurality of sets of optical elements aligned to the plurality of emitters, the plurality of sets of optical elements including: a first set of optical elements, wherein the first set of optical elements includes a collimating lens, and wherein the first set of optical elements includes a tiling diffractive optical element (DOE) at a lens stop position; a second set of optical elements, wherein the second set of optical elements includes a dot aberration correction element; and a third set of optical elements, wherein the third set of optical elements includes an angle expander.

In some implementations, an optical system includes a vertical cavity surface emitting laser (VCSEL) to emit a beam; and a set of optical elements aligned to the VCSEL, the set of optical elements including a group 1 of one or more optical elements, a group 2 of one or more optical elements, and a group 3 of one or more optical elements, wherein the group 1 includes a collimating lens and a diffractive optical element; wherein the group 2 includes a dot aberration correction element, wherein the group 3 includes a fisheye lens, wherein the group 2 is disposed between the group 1 and the group 3, and wherein an output of the optical system is a random or pseudo-random arrangement of dots with a field of view of at least 100 degrees by 100 degrees when the beam is projected on a flat surface.

BRIEF DESCRIPTION OF THE DRAWINGS

FIGS. 5A and 5B are diagrams of an example implementation associated with a fisheye lens dot projector.

DETAILED DESCRIPTION

The following detailed description of example implementations refers to the accompanying drawings. The same reference numbers in different drawings may identify the same or similar elements.

A three-dimensional (3D) sensing time-of-flight (ToF) device, such as a ToF camera, may include an emitter array (e.g., a vertical-cavity surface-emitting laser (VCSEL) array), a lens, and a diffractive optical element (DOE). In operation, light emitted by emitters of the emitter array (e.g., infrared (IR) light) is collimated by the lens, and beams of collimated light (each corresponding to a respective emitter) are directed to the optical element. The optical element distributes the collimated beams of light to create a dot projection (e.g., a projection of the collimated beams) on a subject. More specifically, the optical element diffracts a given beam of light such that diffracted orders of the given beam are transmitted at different angles. The 3D sensing ToF device may include one or more additional elements (e.g., one or more sensors and/or processors) to sense the dot projection and make one or more measurements concerning the subject based on the dot projection.

In many cases, non-uniformity of dots of the dot projection in x and y directions of a field of view (FOV) of a ToF camera facilitates the one or more additional elements in obtaining accurate measurements concerning the subject. For example, a spacing between dots and/or a placement of a dots along (or parallel to) an axis of the FOV of the ToF camera should be non-uniform. Typically, this is achieved by randomizing locations of emitters within the emitter array. It is further achieved by having an optical element (e.g., a DOE and/or a diffuser) generate multiple high order tiles of a zero-order pattern (e.g., a projection of dots associated with the emitter array when no DOE and/or diffuser is present).

Figures 1A, 1B:
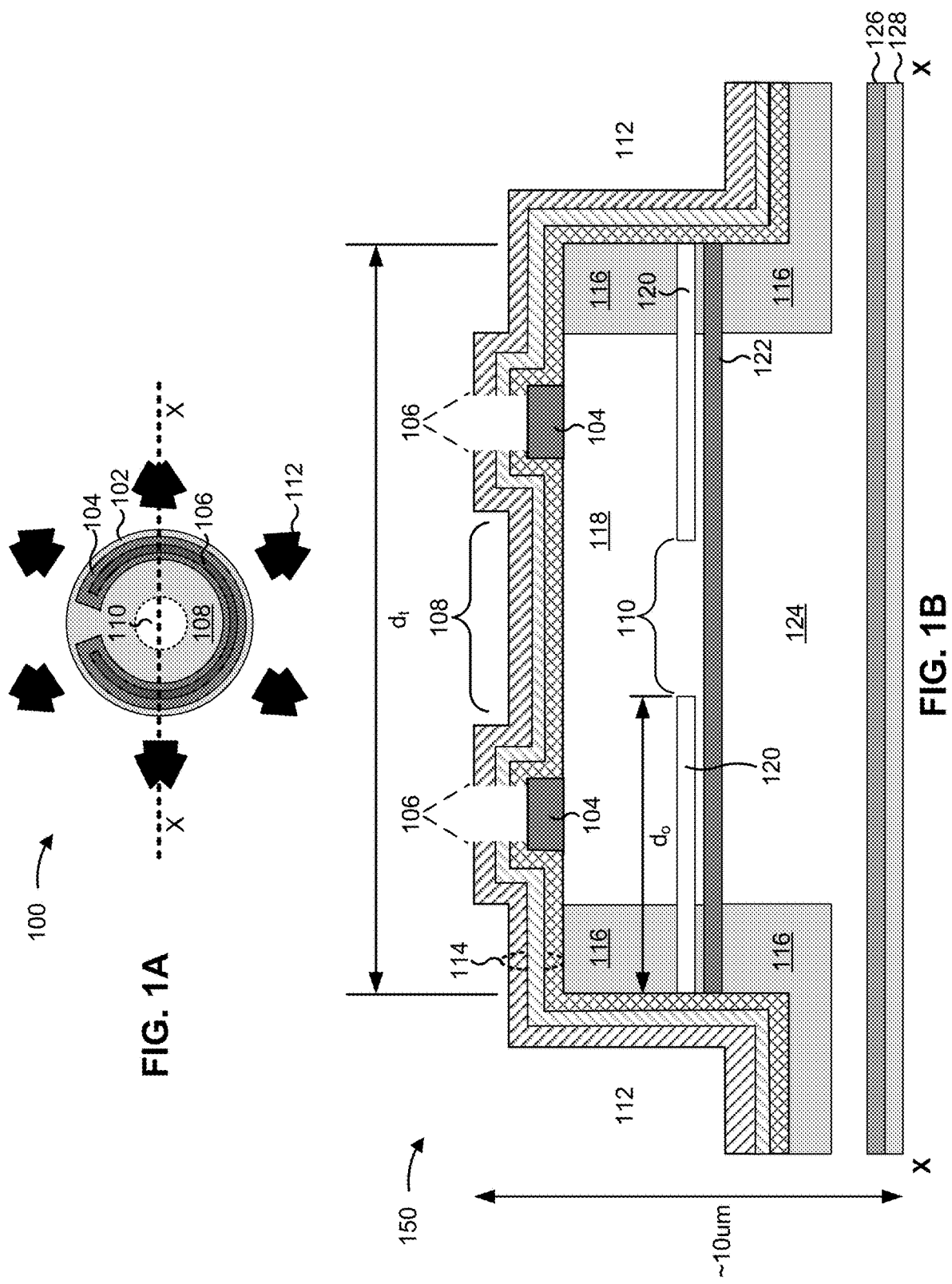
FIGS. 1A and 1B are diagrams depicting an example emitter.

FIGS. 1A and 1B are diagrams depicting a top-view of an example emitter 100 and a cross-sectional view 150 of example emitter 100 along the line X-X, respectively. As shown in FIG. 1A, emitter 100 may include a set of emitter layers constructed in an emitter architecture. In some implementations, emitter 100 may correspond to one or more vertical-emitting devices described herein.

As shown in FIG. 1A, emitter 100 may include an implant protection layer 102 that is circular in shape in this example. In some implementations, implant protection layer 102 may have another shape, such as an elliptical shape, a polygonal shape, or the like. Implant protection layer 102 is defined based on a space between sections of implant material (not shown) included in emitter 100.

As further shown in FIG. 1A, emitter 100 includes an ohmic metal layer 104 (e.g., a P-Ohmic metal layer or an N-Ohmic metal layer) that is constructed in a partial ring-shape (e.g., with an inner radius and an outer radius). The medium gray area shows an area of ohmic metal layer 104 covered by a protective layer (e.g. a dielectric layer or a passivation layer) of emitter 100 and the dark gray area shows an area of ohmic metal layer 104 exposed by via 106, described below. As shown, ohmic metal layer 104 overlaps with implant protection layer 102. Such a configuration may be used, for example, in the case of a P-up/top-emitting emitter 100. In the case of a bottom-emitting emitter 100, the configuration may be adjusted as needed.

Not shown in FIG. 1A, emitter 100 includes a protective layer in which via 106 is formed (e.g., etched). The dark gray area shows an area of ohmic metal layer 104 that is exposed by via 106 (e.g., the shape of the dark gray area may be a result of the shape of via 106) while the medium grey area shows an area of ohmic metal layer 104 that is covered by some protective layer. The protective layer may cover all of the emitter other than the vias. As shown, via 106 is formed in a partial ring-shape (e.g., similar to ohmic metal layer 104) and is formed over ohmic metal layer 104 such that metallization on the protection layer contacts ohmic metal layer 104. In some implementations, via 106 and/or ohmic metal layer 104 may be formed in another shape, such as a full ring-shape or a split ring-shape.

As further shown, emitter 100 includes an optical aperture 108 in a portion of emitter 100 within the inner radius of the partial ring-shape of ohmic metal layer 104. Emitter 100 emits a laser beam via optical aperture 108. As further shown, emitter 100 also includes a current confinement aperture 110 (e.g., an oxide aperture formed by an oxidation layer of emitter 100 (not shown)). Current confinement aperture 110 is formed below optical aperture 108.

As further shown in FIG. 1A, emitter 100 includes a set of trenches 112 (e.g., oxidation trenches) that are spaced (e.g., equally, unequally) around a circumference of implant protection layer 102. How closely trenches 112 can be positioned relative to the optical aperture 108 is dependent on the application, and is typically limited by implant protection layer 102, ohmic metal layer 104, via 106, and manufacturing tolerances.

The number and arrangement of layers shown in FIG. 1A are provided as an example. In practice, emitter 100 may include additional layers, fewer layers, different layers, or differently arranged layers than those shown in FIG. 1A. For example, while emitter 100 includes a set of six trenches 112, in practice, other configurations are possible, such as a compact emitter that includes five trenches 112, seven trenches 112, or another quantity of trenches. In some implementations, trench 112 may encircle emitter 100 to form a mesa structure dt. As another example, while emitter 100 is a circular emitter design, in practice, other designs may be used, such as a rectangular emitter, a hexagonal emitter, an elliptical emitter, or the like. Additionally, or alternatively, a set of layers (e.g., one or more layers) of emitter 100 may perform one or more functions described as being performed by another set of layers of emitter 100, respectively.

Notably, while the design of emitter 100 is described as including a VCSEL, other implementations are possible. For example, the design of emitter 100 may apply in the context of another type of optical device, such as a light emitting diode (LED), or another type of vertical emitting (e.g., top emitting or bottom emitting) optical device. Additionally, the design of emitter 100 may apply to emitters of any wavelength, power level, and/or emission profile. In other words, emitter 100 is not particular to an emitter with a given performance characteristic.

As shown in FIG. 1B, the example cross-sectional view may represent a cross-section of emitter 100 that passes through, or between, a pair of trenches 112 (e.g., as shown by the line labeled "X-X" in FIG. 1A). As shown, emitter 100 may include a backside cathode layer 128, a substrate layer 126, a bottom mirror 124, an active region 122, an oxidation layer 120, a top mirror 118, an implant isolation material 116, a protective layer 114 (e.g. a dielectric passivation/mirror layer), and an ohmic metal layer 104. As shown, emitter 100 may have, for example, a total height that is approximately 10 μm.

Backside cathode layer 128 may include a layer that makes electrical contact with substrate layer 126. For example, backside cathode layer 128 may include an annealed metallization layer, such as an AuGeNi layer, a PdGeAu layer, or the like.

Substrate layer 126 may include a base substrate layer upon which epitaxial layers are grown. For example, substrate layer 126 may include a semiconductor layer, such as a GaAs layer, an InP layer, and/or another type of semiconductor layer.

Bottom mirror 124 may include a bottom reflector layer of emitter 100. For example, bottom mirror 124 may include a distributed Bragg reflector (DBR).

Active region 122 may include a layer that confines electrons and defines an emission wavelength of emitter 100. For example, active region 122 may be a quantum well.

Oxidation layer 120 may include an oxide layer that provides optical and electrical confinement of emitter 100. In some implementations, oxidation layer 120 may be formed as a result of wet oxidation of an epitaxial layer. For example, oxidation layer 120 may be an Al2O3 layer formed as a result of oxidation of an AlAs or AlGaAs layer. Trenches 112 may include openings that allow oxygen (e.g., dry oxygen, wet oxygen) to access the epitaxial layer from which oxidation layer 120 is formed.

Current confinement aperture 110 may include an optically active aperture defined by oxidation layer 120. A size of current confinement aperture 110 may range, for example, from approximately 4 μm to approximately 20 μm. In some implementations, a size of current confinement aperture 110 may depend on a distance between trenches 112 that surround emitter 100. For example, trenches 112 may be etched to expose the epitaxial layer from which oxidation layer 120 is formed. Here, before protective layer 114 is formed (e.g., deposited), oxidation of the epitaxial layer may occur for a particular distance (e.g., identified as do in FIG. 1B) toward a center of emitter 100, thereby forming oxidation layer 120 and current confinement aperture 110. In some implementations, current confinement aperture 110 may include an oxide aperture. Additionally, or alternatively, current confinement aperture 110 may include an aperture associated with another type of current confinement technique, such as an etched mesa, a region without ion implantation, lithographically defined intra-cavity mesa and regrowth, or the like.

Top mirror 118 may include a top reflector layer of emitter 100. For example, top mirror 118 may include a DBR.

Implant isolation material 116 may include a material that provides electrical isolation. For example, implant isolation material 116 may include an ion implanted material, such as a hydrogen/proton implanted material or a similar implanted element to reduce conductivity. In some implementations, implant isolation material 116 may define implant protection layer 102.

Protective layer 114 may include a layer that acts as a protective passivation layer and which may act as an additional DBR. For example, protective layer 114 may include one or more sub-layers (e.g., a dielectric passivation layer and/or a mirror layer, a SiO2 layer, a Si3N4 layer, an Al2O3 layer, or other layers) deposited (e.g., by chemical vapor deposition, atomic layer deposition, or other techniques) on one or more other layers of emitter 100.

As shown, protective layer 114 may include one or more vias 106 that provide electrical access to ohmic metal layer 104. For example, via 106 may be formed as an etched portion of protective layer 114 or a lifted-off section of protective layer 114. Optical aperture 108 may include a portion of protective layer 114 over current confinement aperture 110 through which light may be emitted.

Ohmic metal layer 104 may include a layer that makes electrical contact through which electrical current may flow. For example, ohmic metal layer 104 may include a Ti and Au layer, a Ti and Pt layer and/or an Au layer, or the like, through which electrical current may flow (e.g., through a bondpad (not shown) that contacts ohmic metal layer 104 through via 106). Ohmic metal layer 104 may be P-ohmic, N-ohmic, or other forms known in the art. Selection of a particular type of ohmic metal layer 104 may depend on the architecture of the emitters and is well within the knowledge of a person skilled in the art. Ohmic metal layer 104 may provide ohmic contact between a metal and a semiconductor and/or may provide a non-rectifying electrical junction and/or may provide a low-resistance contact. In some implementations, emitter 100 may be manufactured using a series of steps. For example, bottom mirror 124, active region 122, oxidation layer 120, and top mirror 118 may be epitaxially grown on substrate layer 126, after which ohmic metal layer 104 may be deposited on top mirror 118. Next, trenches 112 may be etched to expose oxidation layer 120 for oxidation. Implant isolation material 116 may be created via ion implantation, after which protective layer 114 may be deposited. Via 106 may be etched in protective layer 114 (e.g., to expose ohmic metal layer 104 for contact). Plating, seeding, and etching may be performed, after which substrate layer 126 may be thinned and/or lapped to a target thickness. Finally, backside cathode layer 128 may be deposited on a bottom side of substrate layer 126.

The number, arrangement, thicknesses, order, symmetry, or the like, of layers shown in FIG. 1B is provided as an example. In practice, emitter 100 may include additional layers, fewer layers, different layers, differently constructed layers, or differently arranged layers than those shown in FIG. 1B. Additionally, or alternatively, a set of layers (e.g., one or more layers) of emitter 100 may perform one or more functions described as being performed by another set of layers of emitter 100 and any layer may comprise more than one layer.

Figure 2:
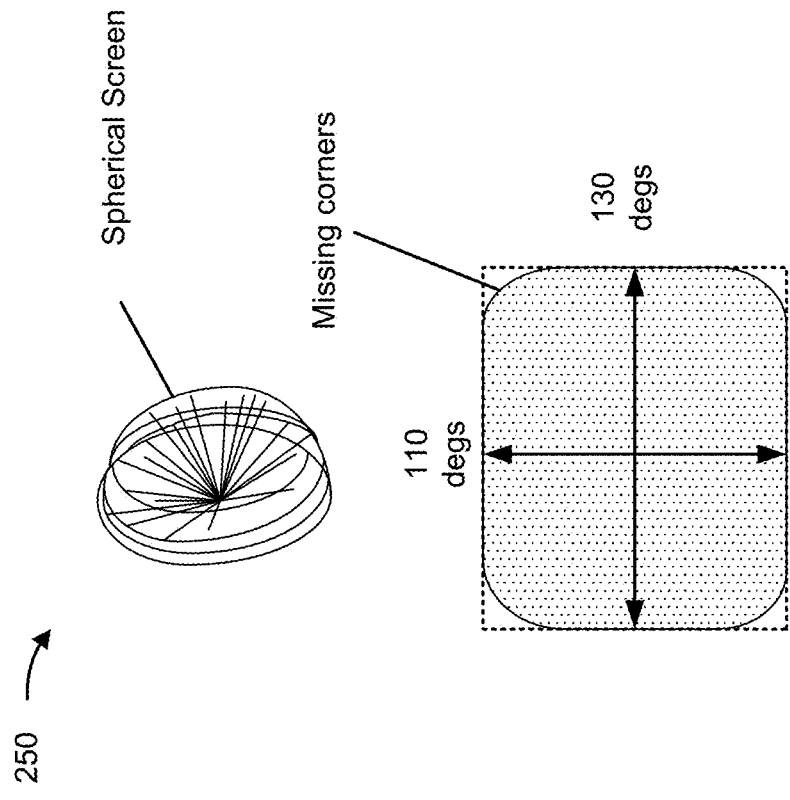
FIG. 2 is a diagram of an examples of a dot projector field of view.
Figure 2:
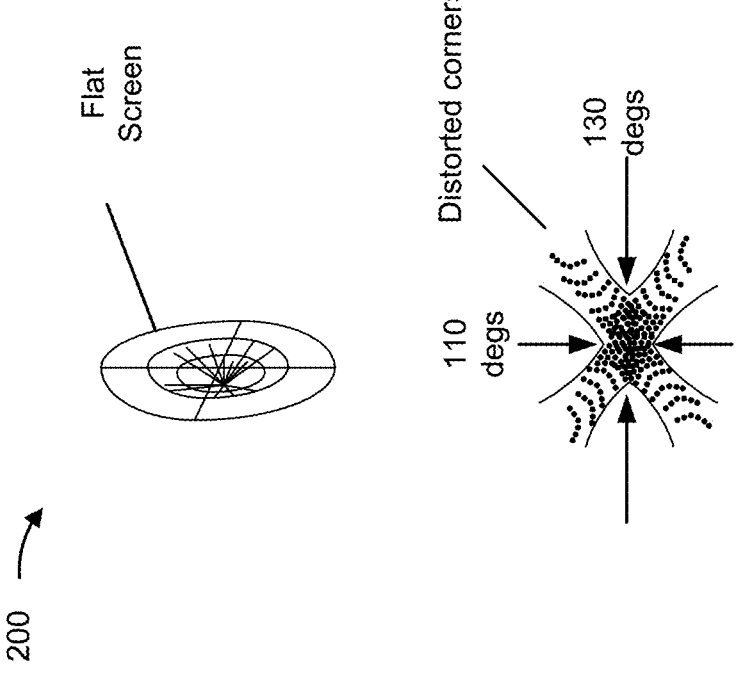

FIG. 2 is a diagram of an examples 200/250 of a dot projector field of view.

As described above, VCSEL-based dot projectors may use an emitter array (e.g., a set of VCSELs), a lens, and a diffractive optical element (DOE) to generate a set of dots. However, VCSEL-based dot projectors may have relatively narrow fields of view (FOVs) to avoid aberrations or discontinuities. For example, VCSEL-based dot projectors may limit an FOV to less than 100 degrees×100 degrees, which may enable projection of a continuous set of dots onto a screen. When the FOV is extended to greater angles, diffraction at corners of the FOV may result in aberrations (e.g., irregularly shaped dots or irregularly shaped patterns of dots) or discontinuities (e.g., missing dots). As shown in example 200, when a VCSEL-based dot projector is used with a 5×5 tiling DOE for a 130 degree×110 degree FOV and is projected on a flat screen, distortion may occur as a result of diagonal DOE diffraction orders. This distortion may be relatively large, such as a television (TV) distortion (e.g., a flat screen distortion) of greater than approximately 10%. Projecting the set of dots onto a spherical screen can counteract the distortion; however, as shown in example 250, outer dots (e.g., dots at corners of the FOV) may be missing as a result of diffraction angles being greater than ±90 degrees (e.g., which results in an evanescent effect, whereby the dots propagate along a surface of the DOE rather than through a medium, such as air). Distorted or missing dots may result in a failure to perform accurate sensing in a portion of an FOV. Some VCSEL-based dot projectors may be configured to account for aberrations or discontinuities at edges of an FOV by being configured with a higher FOV than is necessary for a particular application. For example, a VCSEL-based dot projector may be configured for a 150 degree×130 degree FOV, such that there is no aberration or distortion within a 130 degree×110 degree sub-FOV. In other words, dots are projected with a greater FOV than an FOV for which sensing is to be performed. However, this may result in additional power utilization, more complex DOEs, and/or larger-sized optics to generate over-sized FOVs that enable achievement of a large FOV without aberration or distortion.

As indicated above, FIG. 2 is provided as an example. Other examples may differ from what is described with regard to FIG. 2.

Some implementations described herein provide for a low optical distortion wide-angle FOV of pseudo random dots in a far field projection by interlacing tiles or images of a set of pseudo random VCSEL emitter layouts aligned to an angle expander optic. For example, some implementations use a fisheye lens or other angle expander optic to provide a large FOV dot projection. For example, a dot projector optic may include a collimating lens, a dot aberration correction element, and a fisheye lens to receive a beam from an emitter and provide a wide-FOV, low-distortion dot projection, such as a dot projection with an FOV of greater than 100 degrees×100 degrees and a TV distortion of less than 10%. In this way, dot projectors can be sized for a desired FOV without aberrations or discontinuities, thereby enabling reduced power utilization, reduced DOE complexity, and/or reduced optic size relative to dot projectors that are over-sized for a desired FOV. Additionally, or alternatively, a DOE, in the dot projector optic, is positioned at approximately a stop position of the collimating lens, which enables the DOE to be configured with a smaller maximum diffraction angle than the desired FOV. By enabling DOEs with smaller maximum diffraction angles, some implementations described herein enable increased DOE pitch size, which improves DOE manufacturability. Additionally, or alternatively, the DOE can be configured to suppress some tiling orders to generate an interlaced pattern of dots projected from a plurality of emitters (e.g., of a multi-VCSEL emitter array). In this case, by generating an interlaced pattern of dots, some implementations described herein avoid repeating a pseudo random VCSEL emitter array dot output, thereby increasing randomization of projected dots, which improves sensing performance using the projected dots.

Figure 3:
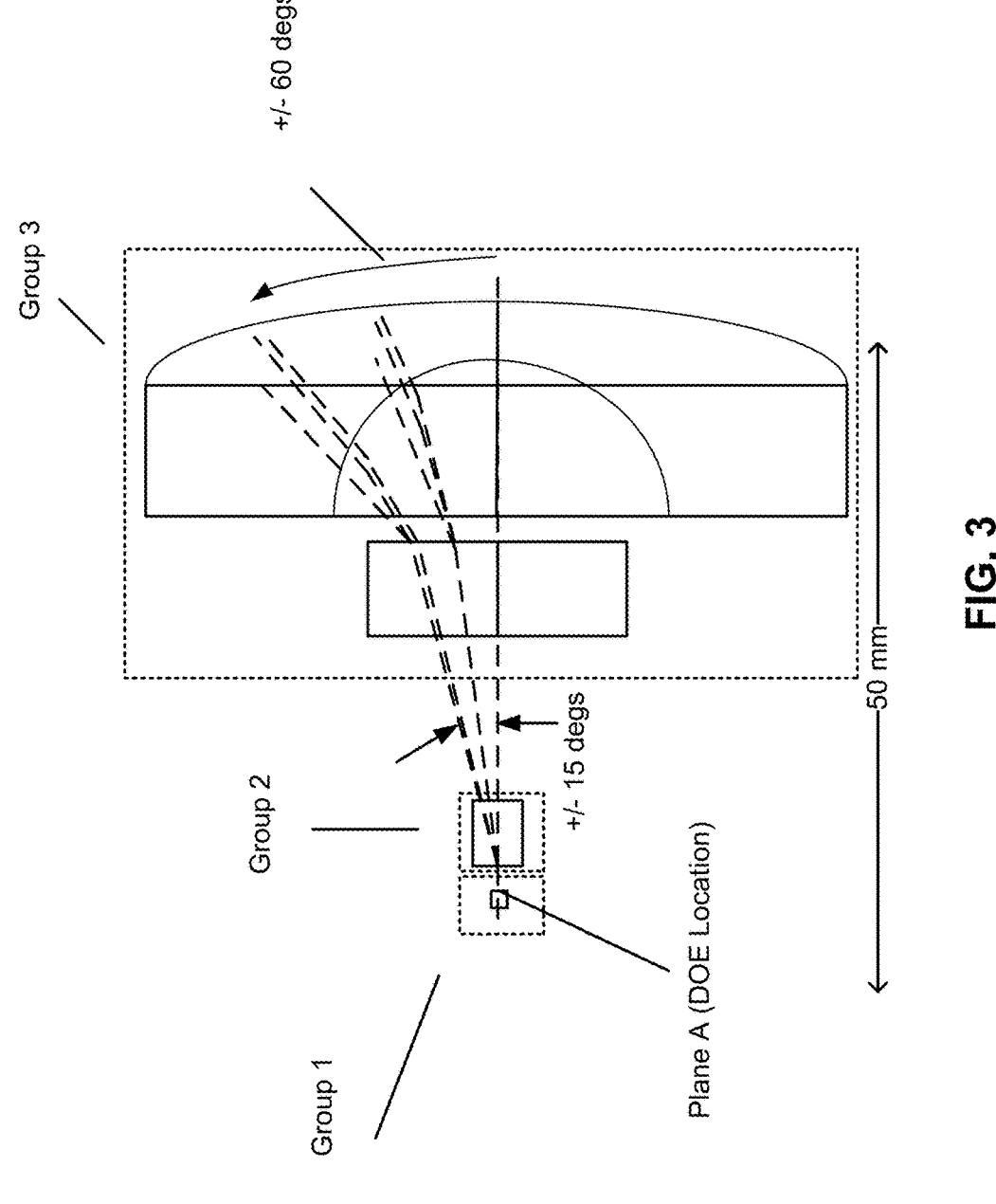
FIG. 3 is a diagram of an example implementation of a dot projector optic.

FIG. 3 is a diagram of an example implementation of a dot projector optic 300. As shown in FIG. 3, dot projector optic 300 includes a set of optical elements, such as one or more group 1 optical elements, one or more group 2 optical elements, and/or one or more group 3 optical elements. In some implementations, dot projector optic 300 may be associated with an optical path length (e.g., from an input at the one or more group 1 optical elements to an output at the one or more group 3 optical elements) of approximately 50 millimeters (mm). Additionally, or alternatively, the dot projector optic 300 may be associated with an optical path length in a range of 10 mm to 100 mm.

The one or more group 1 optical elements are a first set of optical elements that includes a collimating lens and/or a DOE, in some implementations. For example, a collimating lens may be included in a set of dot projector optics to collimate beams of light received from a set of emitters. In some implementations, the collimating lens may include a small-angle collimating lens. For example, the collimating lens may be configured for a particular size VCSEL active area to achieve a desired input angle the DOE. In some implementations, the DOE may be disposed at a location relative to the collimating lens to shape the collimated beams of light into a set of dots that are to be projected onto a screen (e.g., an object in an FOV). In some implementations, the DOE may be disposed at a particular plane, shown as Plane A. For example, the DOE may be disposed at a stop position of the collimating lens. In some implementations, the DOE may be a tiling DOE. For example, the DOE may be configured to shape the collimated light into a set of projections ("tiles"), as described in more detail below.

The one or more group 2 optical elements are a second set of optical elements that includes a dot aberration correction element, in some implementations. For example, a lens may be disposed between the one or more group 1 optical elements and the one or more group 3 optical elements to correct aberrations in dots generated by the DOE shaping collimated beams of light. An output of the one or more group 2 optical elements may be associated with a first FOV angle. For example, a maximum diffraction angle of a beam output from the one or more group 2 optical elements may be approximately ±15 degrees from normal (e.g., resulting in an FOV of 30 degrees). In this case, by being configured to output light with a relatively small maximum diffraction angle, the DOE of the one or more group 1 optical elements can be manufactured with a relatively wide pitch, which may improve manufacturability of the DOE relative to smaller pitch DOEs that are used to achieve larger maximum diffraction angles. As an example, a pitch of the DOE of the one or more group 1 optical elements may be greater than approximately 6 micrometers (μm) (e.g., in an x axis and/or a y axis) in comparison with larger maximum diffraction angle DOEs that may have a pitch of less than approximately 3 μm. In other words, use of a fisheye lens as an angle expander for a dot projector optic 300 may enable doubling of a size of a DOE pitch.

The one or more group 3 optical elements are a third set of optical elements that includes an angle expander, in some implementations. For example, the angle expander may include a fisheye lens that is aligned to the group 1 optical elements and the group 2 optical elements to expand an FOV of an output of the group 1 optical elements and the group 2 optical elements. In this case, the fisheye lens may expand an input associated with a maximum diffraction angle of ±15 degrees and an FOV of 30 degrees to a maximum diffraction angle of a beam output of ±60 degrees and an FOV of 120 degrees.

In some implementations, the one or more group 3 optical elements may include a particular type of fisheye lens. For example, the one or more group 3 optical elements may include a multi-element telecentric fisheye lens, as shown in FIG. 3. In this case, the multi-element telecentric fisheye lens generates a wide angle FOV by angle-magnifying a collimated (small angle) input beam that is generated by the one or more group 1 optical elements and the one or more group 2 optical elements. Additionally, or alternatively, an angle expander (e.g., a fisheye lens) may be associated with a particular shape. For example, the one or more group 3 optical elements may include a spherical surface fisheye lens, an aspherical surface fisheye lens, a circular fisheye lens, a diagonal fisheye lens, a hemispherical fisheye lens, a full-frame fisheye lens, a cropped fisheye lens, or a bird's eye lens, among other examples. Additionally, or alternatively, the one or more group 3 optical elements may include a lens manufactured from a particular type of material, such as a glass lens, a plastic lens, or a crystal lens, among other examples. In this case, the fisheye lens may include a material with a refractive index in a range of, for example, 1.4 to 2.0. In some implementations, one or more coatings may be applied to an optical element, including the one or more group 3 optical elements, such as anti-reflectance coatings, filter coatings, or protective coatings, among other examples. In some implementations, the fisheye lens may be a refractive optical element, a diffractive optical element, a hybrid refractive/diffractive optical element, a multi-level phase element, a meta-optical element, or a combination thereof. For example, using a meta-optical element or a multi-level phase optical element may reduce an optics total track length (TTL) from, for example, 50 mm, as described above, to a shorter TTL (e.g., less than 50 mm or less than 25 mm), which may enable inclusion of the dot projector optic 300 in increasingly miniaturized optical systems.

In some implementations, the fisheye lens may expand an input beam in multiple dimensions. For example, although FIG. 3 shows an example of expanding the FOV of a beam in a y axis, the fisheye lens may expand the input beam in the y axis and an x axis, resulting in a 120 degree×120 degree FOV. In some implementations, an FOV generated by a dot projector optic 300 described herein may be at least 100 degrees×100 degrees. Although some implementations are described herein in terms of a square arrangement of dots for an FOV, another arrangement, such as a rectangular arrangement of dots (e.g., a 120 degrees×100 degrees FOV), may be used. In some implementations, the dot projector optic 300 may be associated with at least a threshold quantity of dots. For example, the dot projector optic may project at least 100, at least 500, at least 1000, at least 2000, at least 4000, or at least 8000 dots within an FOV. In this way, the dot projector optic 300 achieves a threshold level of detection granularity, thereby enabling accurate sensor measurements of, for example, an object or surface onto which the dots are projected.

As indicated above, FIG. 3 is provided as an example. Other examples may differ from what is described with regard to FIG. 3. The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) shown in FIG. 3 may perform one or more functions described as being performed by another set of devices shown in FIG. 3.

Figure 4A:
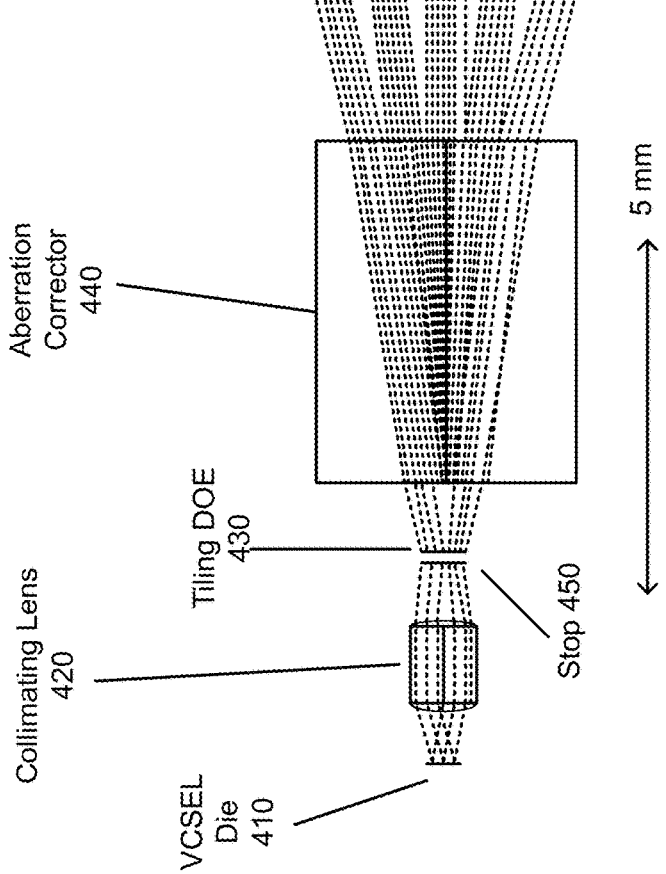
FIGS. 4A and 4B are diagrams of an example optical system associated with a fisheye lens dot projector.
Figure 4A:
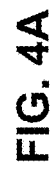
Figure 4B:
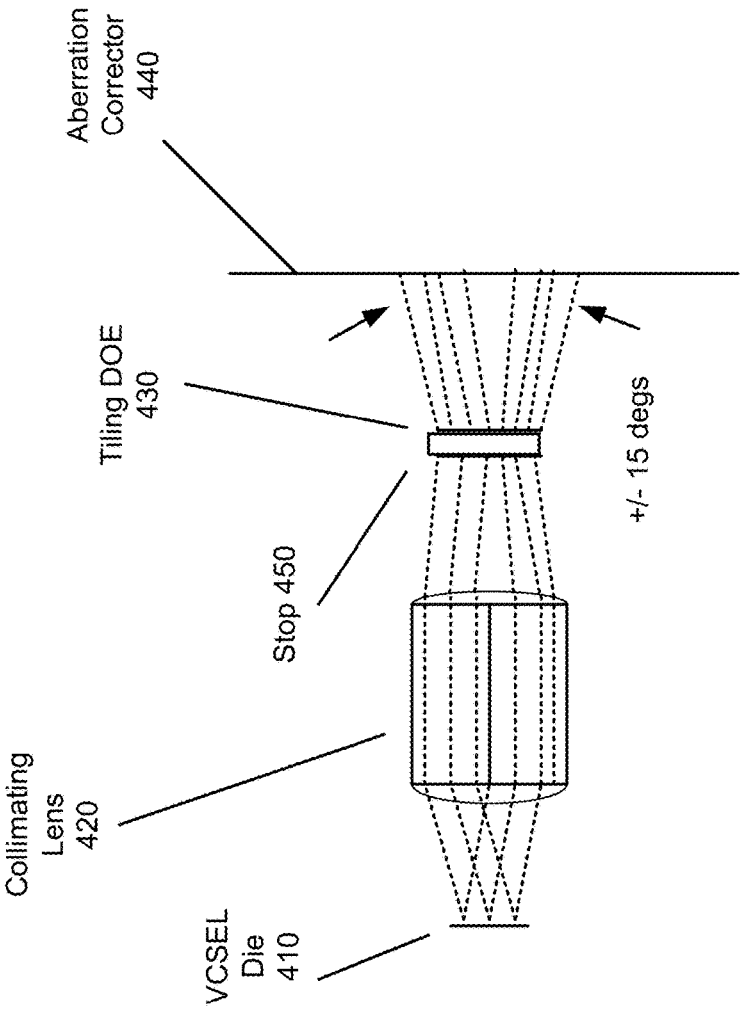

FIGS. 4A and 4B are diagrams of an example optical system 400 associated with a fisheye lens dot projector. As shown in FIG. 4A, the optical system 400 includes a VCSEL die 410, a collimating lens 420, a tiling DOE 430, and an aberration corrector 440. FIG. 4B illustrates a zoom-in view of the group 1 optics (e.g., the collimating lens 420 and tiling DOE 430). In some implementations, the optical system 400 includes a measurement system, a three-dimensional (3D) imaging system, a gesture recognition system, a facial recognition system, or a communication system, among other examples.

In some implementations, the VCSEL die 410 may include a set of VCSEL elements (e.g., a VCSEL array, such as a 2×2 VCSEL array, a 3×3 VCSEL array, or a 2×4 VCSEL array, among other examples). For example, the VCSEL die 410 may include one or more VCSELs or VCSEL arrays to emit one or more beams toward a set of dot projector optics as part of the optical system 400. In this case, a plurality of VCSEL arrays (e.g., a first 3×3 VCSEL array and a second 3×3 VCSEL array) may be provided on one or more VCSEL dies 410 to enable projections of a plurality of layouts of dots in a single, interlaced dot projection, as described below. Additionally, or alternatively, another type of emitter may be included in the optical system 400, that uses a set of dot projector optics, such as an edge emitter laser (EEL) or a diode, among other examples. In some implementations, the VCSEL die 410 may include at least one polarized VCSEL emitter. For example, the VCSEL die 410 may include a set of polarized VCSEL emitters, which may be used with a polarization-sensitive tiling DOE 430 (or a meta-optical element (MOE)) to achieve alternative structured light patterns, such as for far field projection. In another example, rather than a polarized VCSEL emitter, a polarized optic (e.g., the collimating lens 420 or another optic) may be aligned to an optical path to polarize light.

The collimating lens 420 may receive a set of beams as input from VCSEL elements of the VCSEL die 410, collimate the set of beams, and direct the collimated set of beams to the tiling DOE 430, which is disposed approximately at a stop position 450 (e.g., a lens stop) of the collimating lens 420. For example, the tiling DOE 430 may be located at the stop position 450±10% of a distance between the stop position 450 and the collimating lens 420. In this case, locating the tiling DOE 430 relatively close to the stop position 450 enables use of a relatively small tiling DOE, as beam size is at a minimum at the stop position 450. Moreover, using a relatively small angle tiling DOE 430 (e.g., with a relatively small pitch) at the stop position 450 of the collimating lens 420, results in an output of the optical system 400 having a relatively low distortion and fewer lost dots than occurs with a larger angle tiling DOE.

As indicated above, FIGS. 4A and 4B are provided as an example. Other examples may differ from what is described with regard to FIGS. 4A and 4B.

Figure 5A:
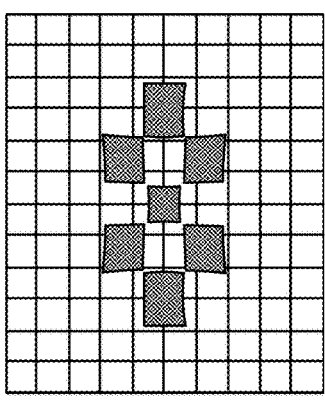
Figure 5A:
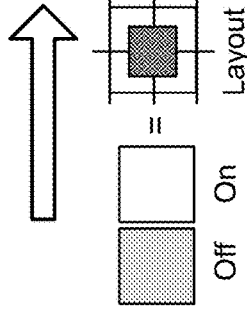

FIGS. 5A and 5B are diagrams of an example implementation 500 associated with a fisheye lens dot projector. As shown in FIGS. 5A and 5B, a DOE, such as the DOE 430, may be configured to tile a set of beams to generate a dot projection. For example, in example implementation 500, a 5×3 tiling DOE is provided to generate a tiled dot projection. In FIG. 5A, 8 of the orders of the tiling DOE are suppressed (e.g., "Off" orders at (−2, 1), (0, 1), . . . , (2, −1), as shown) and 7 of the orders are not suppressed (e.g., "On" orders at (−1, 1), . . . (1, −1), which have a particular layout of dots, as shown). In this case, the "On" orders create a checkerboard-type pattern. With a single VCSEL active area (e.g., a single VCSEL emitter array) providing a single "layout" of dots for projection, a fisheye lens, as described above, generates the grid shown in the diagram at right in FIG. 5A. By suppressing each second tiling order associated with the DOE, the DOE can project an interlaced composite pattern image of two different emitter areas associated with two different VCSEL emitter arrays with two different layouts, as shown in FIG. 5B. For example, the DOE can project an interlaced composite pattern of dots that includes a regular arrangement of dots, a random arrangement of dots, a pseudo random arrangement of dots, or a combination thereof. In this case, the DOE may be aligned to one or more chips (e.g., VCSEL emitter chips) to generate the pattern of dots. As an example, the DOE can project a first dot layout with a regular arrangement of dots overlaid with a second dot layout with a pseudo random arrangement of dots.

As shown in FIG. 5B, using two emitters with suppressed tiling orders results in a horizontally (angularly) larger set of tiles than is achieved with a single active area. The DOE for the example implementation 500 in FIG. 5B can have a DOE pitch that is selected so that a final image, shown at right in FIG. 5B, is an interlaced pattern of two different emitter layouts. This improves dot projection relative to using a single pseudo random VCSEL emitter array (e.g., as in FIG. 5A). In another example, rather than interlacing emissions from a plurality of VCSEL chips, a first VCSEL chip may include a first dot pattern (e.g., a first set of emitters) and a second dot pattern (e.g., a second set of emitters) and a second VCSEL chip may include a third dot pattern (e.g., a third set of emitters) and a fourth dot pattern (e.g., a fourth set of emitters). In this case, the first set of emitters may be spaced by a threshold spacing from the second set of emitters on the first VCSEL chip and the third set of emitters may be spaced by a threshold spacing from the fourth set of emitters on the second VCSEL chip. A DOE may interlace the first through fourth dot patterns (e.g., a tiling of the first dot pattern, the third dot pattern, the second dot pattern, and the fourth dot pattern, in order). In other words, tilings in which each chip is side-by-side and patterns are separated, tilings in which each chip is side-by-side and patterns are overlapping, and tilings in which each chip is side-by-side and patterns are at least partially overlaid are all contemplated, among other examples. In other examples, non-side-by-side chips may be possible and result in other combinations or arrangements of patterns.

The DOE may be configured to achieve full extinction of the suppressed orders to minimize cross-talk and/or image ghosting (e.g., partial projection of a "suppressed" image), which may reduce an accuracy of sensor measurements performed on projected dots. Although some implementations are described in terms of a rectangular tiling (e.g., a 5×3 tiling, as shown, or another rectangular tiling), other tilings, such as a square tiling (e.g., a 2×2 tiling or a 3×3 tiling), among other examples, may be used. In FIG. 5B, as shown, the tiling that is used results in two dot tiles being outside the FOV, which may reduce FOV efficiency (e.g., a percentage of projected light that is within the FOV). In another example, a tiling DOE may be used that has more tiles than a VCSEL emitter array area. For example, a 2×2 VCSEL area may be combined in a checkerboard pattern with a 3×3 tiling DOE. This configuration may eliminate tiles being projected outside of an FOV and/or may reduce ghosting of light leaked into nominally suppressed orders. In some implementations, a tiling DOE may be used with a row-shifted pattern or column-shifted patterns. In some implementations, emitter areas of the 2×2 VCSEL area may be individually-addressable pseudo random rows or columns or sub-zones in a pseudo random pattern, which may enable improved control of which dots are projected, and/or a level of randomness of dots that are projected, by turning on or off certain dots, rows, columns, or sub-zones.

As indicated above, FIGS. 5A and 5B are provided as an example. Other examples may differ from what is described with regard to FIGS. 5A and 5B.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, satisfying a threshold may depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A dot projector optic, comprising:
a collimating lens;
a fisheye lens,
    wherein the fisheye lens includes a telecentric fisheye lens; and
a dot aberration correction element, separate from the collimating lens and disposed between the collimating lens and the fisheye lens, wherein an input to the fisheye lens, from the dot aberration correction element, is associated with a first field of view angle, and wherein an output from the fisheye lens is associated with a second field of view angle that is larger than the first field of view angle.

2. The dot projector of claim 1,
wherein the first field of view angle is less than or equal to 30 degrees when a first beam with the first field of view angle is projected onto a plane and the second field of view angle is greater than or equal to 120 degrees when a second beam with the second field of view angle is projected onto the plane.

3. The dot projector optic of claim 1,
wherein a ratio of the second field of view angle to the first field of view angle is at least 4:1.

4. The dot projector optic of claim 1,
wherein the output from the second field of view angle is associated with a rectangular arrangement of dots.

5. The dot projector optic of claim 1,
wherein the fisheye lens is a multi-element telecentric fisheye lens.

6. The dot projector optic of claim 1, further comprising:
a diffractive optical element disposed between the collimating lens and the dot aberration correction element.

7. The dot projector optic of claim 6,
wherein a pitch of the diffractive optical element is greater than 6 micrometers.

8. The dot projector optic of claim 1,
wherein the fisheye lens includes at least one of:
    a spherical surface, or
    an aspherical surface.

9. The dot projector optic of claim 1,
wherein the fisheye lens includes at least one of:
    a glass optic, or
    a plastic optic.

10. The dot projector optic of claim 1,
wherein the fisheye lens is associated with a refractive index in a range of 1.4 to 2.0.

11. An optical system, comprising:

a plurality of emitters; and a plurality of sets of optical elements aligned to the plurality of emitters, the plurality of sets of optical elements including:

a first set of optical elements, wherein the first set of optical elements includes a collimating lens, and wherein the first set of optical elements includes a tiling diffractive optical element (DOE) at a lens stop position, and wherein the tiling DOE forms beams from the plurality of emitters into a set of tiles that are interlaced with one or more orders suppressed;

a second set of optical elements, wherein the second set of optical elements includes a dot aberration correction element; and a third set of optical elements, wherein the third set of optical elements includes an angle expander.

12. The optical system of claim 11, wherein the first set of optical elements and the second set of optical elements are configured to output a first collimated beam with a first field of view angle, and wherein the third set of optical elements is configured to receive the first collimated beam and output a second collimated beam with a second field of view angle, the second field of view angle being larger than the first field of view angle.

13. The optical system of claim 11, wherein an output of the optical system includes an interlaced composite pattern of the plurality of emitters, wherein the interlaced composite pattern is for emitting of dots.

14. The optical system of claim 13, wherein the interlaced composite pattern of dots includes at least one of:

a regular arrangement of dots, a random arrangement of dots, or a pseudo random arrangement of dots.

15. The optical system of claim 11, wherein the tiling DOE forms a first dot layout and a second dot layout, the first dot layout being different from the second dot layout, the first dot layout being overlaid with the second dot layout.

16. An optical system, comprising:

a vertical cavity surface emitting laser (VCSEL) to emit a beam; and a set of optical elements aligned to the VCSEL, the set of optical elements including a group 1 of one or more optical elements, a group 2 of one or more optical elements, and a group 3 of one or more optical elements, wherein the group 1 includes a collimating lens and a diffractive optical element, wherein the group 2 includes a dot aberration correction element, wherein the group 3 includes a fisheye lens, wherein the group 2 is disposed between the group 1 and the group 3, and wherein an output of the optical system is a random or pseudo-random arrangement of dots with a field of view of at least 100 degrees by 100 degrees when the beam is projected on a flat surface.

17. The optical system of claim 16, wherein the optical system includes at least one of:

a measurement system, a three-dimensional imaging system, a gesture recognition system, or a communication system.

18. The optical system of claim 16, wherein at least one optical element, of the set of optical elements, includes at least one of: a meta-optic or a multi-level phase optic.

19. The optical system of claim 16, wherein a flat screen distortion of the output of the optical system is less than 5%.

20. The optical system of claim 16, wherein the fisheye lens is a telecentric fisheye lens.

* * * * *